No. 662,233. Patented Nov. 20, 1900.
W. HAYLOR.
STOVEPIPE.
(Application filed May 31, 1900.)
(No Model.)

Witnesses:
I. Sovereign
Prescott D. Yates

Inventor:
William Haylor
By A. O. Behel
Atty.

UNITED STATES PATENT OFFICE.

WILLIAM HAYLOR, OF BELVIDERE, ILLINOIS.

STOVEPIPE.

SPECIFICATION forming part of Letters Patent No. 662,233, dated November 20, 1900.

Application filed May 31, 1900. Serial No. 18,548. (No model.)

*To all whom it may concern:*

Be it known that I, WILLIAM HAYLOR, a citizen of the United States, residing at Belvidere, in the county of Boone and State of Illinois, have invented certain new and useful Improvements in Stovepipes, of which the following is a specification.

The object of this invention is to secure a section of pipe in a flue or chimney in such a manner that it can be removed.

Figure 1:
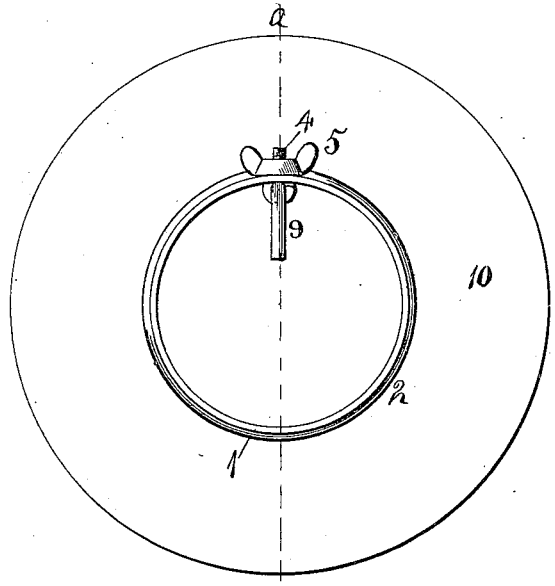
Figure 2:
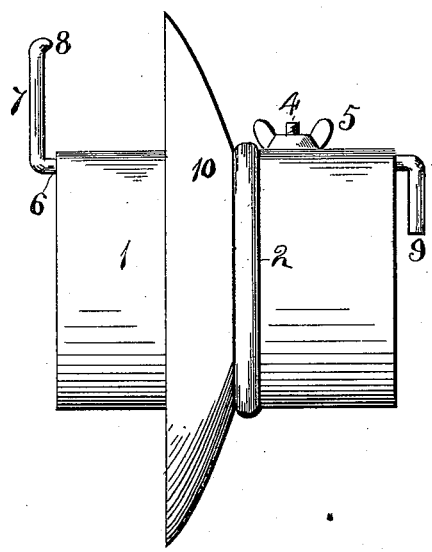
Figure 3:
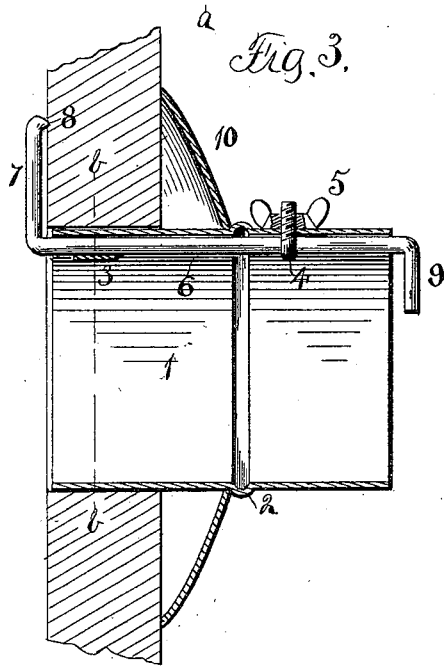
Figure 4:
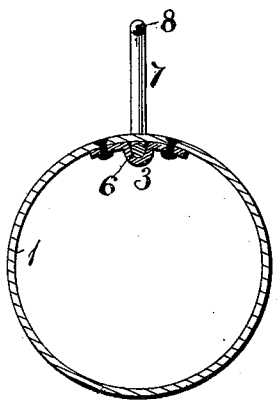

In the accompanying drawings, Figure 1 is an end elevation of a section of stovepipe showing my improvements. Fig. 2 is a side elevation. Fig. 3 is a lengthwise section on dotted line $a$, Fig. 1, showing a section of a chimney. Fig. 4 is a transverse section on dotted line $b$, Fig. 3.

In setting up stoves the first length of pipe is placed in the thimble placed in the chimney and is held by frictional contact, and as the thimble and pipe vary in diameter the pipe often falls down, sometimes causing serious results.

My invention is designed to securely hold the first length of pipe in the chimney in a removable manner.

The first length of pipe 1 is of the usual construction, in this instance having the bead 2. To the inside of the pipe and near one end is secured a guide 3, and near the other end is formed an opening through which is placed a hook 4, having a thumb-nut 5 on its screw-threaded end. A rod 6 is located in the guide 3 and hook 4, and one end 7 is bent at right angles to its length having a return-pointed end 8, and its other end 9 is bent in hook form. The rod in this instance is of a length greater than the length of pipe. A collar 10 is placed on the length of pipe and rests against the bead 2. The length of pipe is placed in the opening in the chimney until the collar rests against the face of the chimney. The rod 6 is moved in the lengthwise direction of the pipe until the pointed end 8 rests against the inner face of the chimney. The pipe is then pressed inward until the collar is firmly seated against the chimney, when the thumb-nut 5 is turned down, clamping the rod against the inside of the pipe, holding the pipe firmly in the chimney and making a tight joint between the collar and chimney-face.

The second length of pipe is placed within the first length and between the rod and under face of the pipe with sufficient friction to prevent its accidental displacement.

I claim as my invention—

The combination of a section of stovepipe having an outwardly-extending bead, a collar surrounding the pipe and resting against the bead, a rod located within the pipe having its ends bent at right angles to its length and extending in opposite directions, a guide for one end of the rod, a screw-threaded hook extending through the pipe and encircling the rod and a thumb-nut on the hook serving to clamp the rod against the inner face of the pipe.

WILLIAM HAYLOR.

Witnesses:
A. O. BEHEL,
E. BEHEL.